Dec. 18, 1956 L. D. ANDERSON 2,774,535
VARIABLE AMPLITUDE SIGNAL ANALYZER
Filed April 21, 1952 5 Sheets-Sheet 1

FIG. I.

INVENTOR
LLOYD D. ANDERSON
BY
ATTORNEYS

Dec. 18, 1956  L. D. ANDERSON  2,774,535
VARIABLE AMPLITUDE SIGNAL ANALYZER
Filed April 21, 1952  5 Sheets-Sheet 2

INVENTOR
LLOYD D. ANDERSON
BY
ATTORNEYS

Dec. 18, 1956 L. D. ANDERSON 2,774,535
VARIABLE AMPLITUDE SIGNAL ANALYZER
Filed April 21, 1952 5 Sheets-Sheet 3

INVENTOR
LLOYD D. ANDERSON
BY
ATTORNEYS

Dec. 18, 1956   L. D. ANDERSON   2,774,535
VARIABLE AMPLITUDE SIGNAL ANALYZER
Filed April 21, 1952   5 Sheets-Sheet 4

INVENTOR
LLOYD D. ANDERSON
BY
ATTORNEYS

Dec. 18, 1956  L. D. ANDERSON  2,774,535
VARIABLE AMPLITUDE SIGNAL ANALYZER
Filed April 21, 1952  5 Sheets—Sheet 5

INVENTOR
LLOYD D. ANDERSON
BY
ATTORNEYS

United States Patent Office

2,774,535
Patented Dec. 18, 1956

2,774,535

VARIABLE AMPLITUDE SIGNAL ANALYZER

Lloyd D. Anderson, Tacoma Park, Md.

Application April 21, 1952, Serial No. 283,481

11 Claims. (Cl. 235—92)

(Granted under Title 35, U. S. Code (1952), sec. 266)

The invention described herein may be manufactured and used by or for the Government of the United States of America for governmental purposes without the payment of any royalties thereon or therefor.

The present invention relates to a signal analyzer and counter, and more particularly to an analyzer and counter for a signal varying in amplitude with respect to time.

The invention is particularly useful when it is desired to measure amount and number of stress variations which occur in an object being tested. For example, in a ship at sea the structure of the ship is subject to continuous and at times violent fluctuations in stress. In order to simulate in the laboratory the conditions which exist on the ship and in order to evaluate the fatigue data of the material used in the ship's structure, it is necessary to have some measure of the magnitude and number of cycles of stress variation present. Oscillographic records may be taken of the stress variation, and these records may be analyzed statistically but the amount of labor involved becomes prohibitive for an adequate evaluation of all the conditions to which a ship is subjected.

In accordance with prior art, various measurement and counting circuits are used to analyze stress variations but they suffer from numerous defects and limitations. Some of such devices involve the use of mechanical contractors, contacting arms, and sliding bearings. Arcing of contacts and corrosion cause failure of such devices; and close tolerances on moving parts have to be maintained. Electronic systems have also been employed for making stress measurements but such systems are inadequate to properly record the variations. The present invention obviates such difficulties by providing a novel electronic system utilizing voltage pickup means wherein the voltage varies in a manner proportional to stress placed on the object, and wherein a unique arrangement is provided to statistically record the data desired. The system may be used to analyze any signal varying in amplitude with respect to time and consequently can be used to analyze variations in such physical quantities as temperature, pressure, velocity, etc. However, in a preferred embodiment it is used to measure stress variations.

If it is desired to represent graphically the variation in stress of an object under test, a curve of stress versus time may be drawn. If stress is used as the axis of ordinates and time as the axis of abscissae, variation in stress will appear as a curve of varying amplitude. If the object under test is subjected to increasing tension this may be represented as a region where the ordinates of the curve increase; and if the object is being subjected to decreasing tension or compression this may be represented as a region on the curve where the ordinates decrease. The curve representing the variation in tension and compression will therefore have flection points where increasing tension changes to decreasing tension and where increasing compression changes to decreasing compression.

It is a principal object of this invention to record the number of such flection points as well as the difference in value of stress between such flection points. This is accomplished by the use of a number of counter tubes arranged in a plurality of electronic circuit channels, each channel corresponding to a predetermined datum level of stress. The tubes are so arranged that they indicate the number of stress flections which occur at any particular datum level and also the difference in numbers of datum levels between stress flection points. In the particular five level analyzer herein disclosed, there are three identical middle datum level channels, and a highest, and a lowest datum level channel. All the channels function in a substantially identical manner. Each middle channel includes a pulse generator which is actuated from a suitable pickup. The pulse generator is tied to a paraphase amplifier which produces two signals, one of which indicates increasing stress, and the other of which indicates decreasing stress at the particular datum level that the channel is responsive to. These two signals are fed to pulse gate means which produces a positive pulse at one output lead when stress is increasing and produces a positive pulse at another output lead when stress is decreasing through the particular datum level concerned. These pulses are fed to positive and negative memory elements respectively. The memory elements control the actuation of the counter tubes in the channel. By arranging the counter tubes in a suitable fashion, a tally may be kept of the flection points and the variation in datum levels between flection points of a signal varying in amplitude with respect to time.

The invention may be suitably modified as by changing the number of channels and the type of counters used with the counter tubes depending on the particular metering use required. Mechanical counters may be used in conjunction with the counter tubes if the signal to be analyzed varies at a low frequency. If, however, the signal is varied at a high frequency suitable electronic counters must, of course, be utilized.

Accordingly it is another object of the present invention to provide a signal analyzer wherein a group of counter tubes are arranged so as to provide a tally of the number of flections of a signal to be analyzed.

It is a further object of the invention to provide a stress cycle counter wherein there are provided suitable memory circuits which actuate a plurality of counter tubes in such a manner as to record the magnitude and number of stress flections.

It is a further object of the invention to provide a stress cycle counter wherein there are provided memory circuits which are so arranged that they tally and also reset automatically when there is a stress flection at the datum level to which they correspond.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
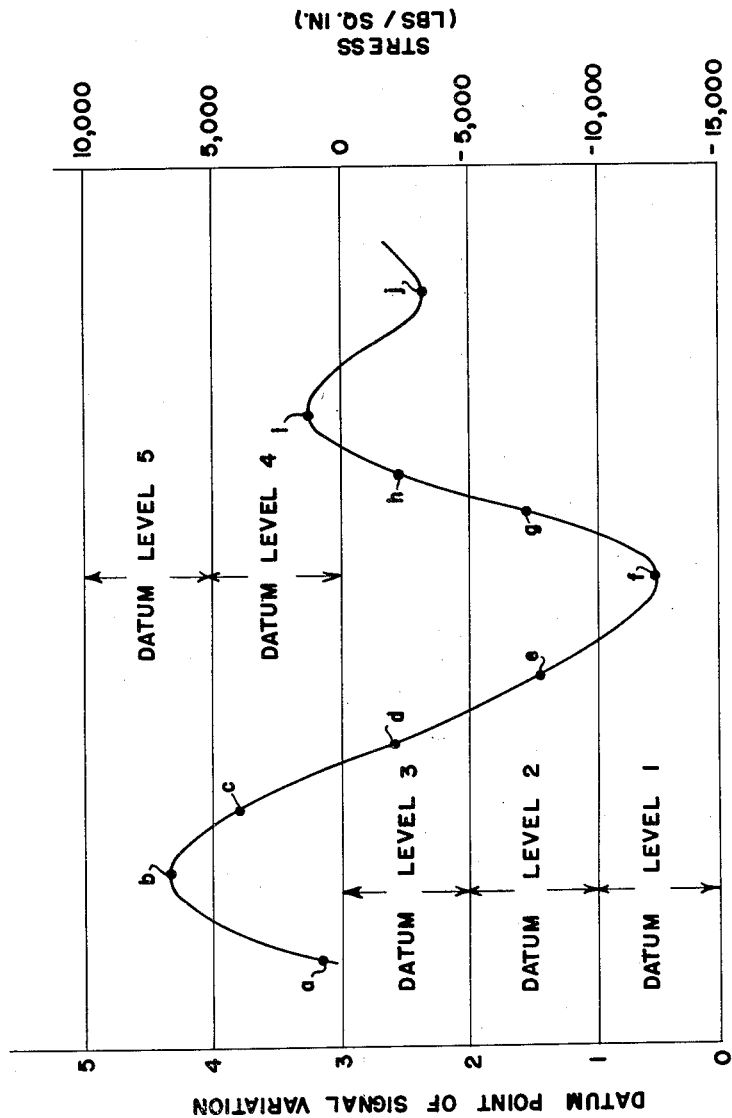
Fig. 1 illustrates a typical compound curve of stress and signal variations as ordinates versus time as abscissae.

Referring now to the drawings, there is shown in Fig. 1 a typical stress curve. It is noted that there are two axes of ordinates, one axis is designated as Datum Point of Signal Variation, the other axis is designated as Stress, in pounds per square inch. The range of stress to be encountered is assumed to vary from +10000 pounds per square inch to −15000 pounds per square inch. In the curve of Fig. 1 the line of the zero datum point of signal variation is also representative of the line of −15000 pounds per square inch of stress; and similarly the line of the first datum point of signal variation corresponds to the line of −10000 pounds per square inch of stress, the line of the second datum point of signal variation corresponds to the line of −5000 pounds per square inch of stress, the line of the third datum point of signal variation corresponds to the line of zero pounds of stress, the line of the fourth datum point of signal variation corresponds to the line of +5000 pounds per square inch of stress, and the line of the fifth datum point of signal variation corresponds to the line of +10000 pounds per square inch of stress.

The two axes of ordinates are used to clearly illustrate the correspondence between stress variation and amplitude of signal voltage generated by suitable pickup means attached to the object which is subject to stress variation.

The choice of the number of datum points to be used and the point of zero stress in Fig. 1 is a matter of choice. If a six level signal analyzer were to be utilized six datum points would be selected. Since the particular embodiment illustrated is a five level analyzer the stress range is divided by using only five datum points. Similarly the point of zero stress could be moved down so as to correspond to the zero datum level if only positive stress were to be encountered; since both positive and negative stress will be present in the arrangement to be described the zero point of stress is set at the third datum point.

For purposes of explanation, the variation in signal amplitude between datum point 0 and datum point 1 is said to be in the first datum level, variation between datum point 1 and datum point 2 is said to be in the second datum level, etc. Thus, for example it is seen that point $a$ of Fig. 1 is located in the fourth datum level, point $b$ is located in the fifth datum level, point $f$ is located in the first datum level, point $i$ is located in the fourth datum level, and point $j$ is located in the third datum level.

At points $b$, $f$, $i$, and $j$ stress flections occur. That is to say a change in sense of the stress occurs at these points. At point $b$ positive stress stops increasing and begins to decrease. Between points $c$ and $d$ positive stress decreases through the zero point and then becomes negative. Stress becomes more negative until point $f$ is reached. Point $f$ is a flection point, and it is seen that stress begins to increase at this point. Similarly points $i$ and $j$ are flection points at which the sense of the stress changes.

In order to statistically analyze the stress curve of Fig. 1 it is necessary to tally the number of flection points passed through in a given time, and also the difference in datum levels the stress passes through from one flection point to a succeeding one. At flection point $b$ of Fig. 1 stress is in the fifth datum level. Stress then decreases through the fourth, third, second, and into the first datum level where point $f$ is reached. This represents a drop from the fifth datum level of four datum levels of stress. Similarly from the flection point at $f$ to the flection point at $i$ there is an increase of three datum levels of stress commencing from the first datum level. Also from point $i$ to point $j$ there is a drop of one datum level which commences from the fourth datum level. This may be recorded on a series of counters arranged as in Fig. 2.

Figure 2:
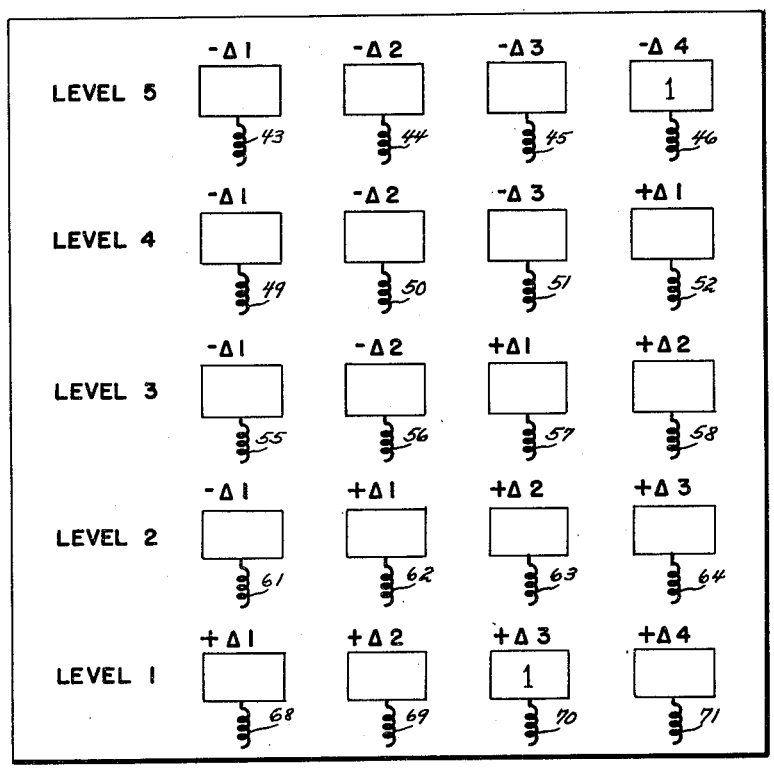
Fig. 2 is a diagrammatic view of a suitable tally scheme for a five level signal analyzer embodying the invention.

Fig. 2 illustrates schematically a series of counters arranged in five superimposed channels, marked levels 1, 2, 3, 4, and 5, each channel corresponding to datum levels 1, 2, 3, 4, and 5, respectively, of signal variation. There are four counters in each channel, each counter of a channel being labelled in terms of the datum levels through which a signal can go down or up from the level that the counter is in.

It is apparent from Fig. 1 that in the fifth datum level the signal can decrease one level, two levels, three levels, or four levels. In the fourth datum level the signal can decrease through one, two, or three levels, or increase one level. In the third datum level the signal can decrease one or two levels, and it can increase through one or two levels. Similarly for the second datum level, the signal can decrease by one level or it can increase through one, two, or three datum levels. In the first level the signal can only increase one, two, three or four levels. It is therefore apparent why the counters of Fig. 2 in the level 5 are designated at −Δ1, −Δ2, −Δ3, and −Δ4; the counters in level 4 as −Δ1, −Δ2, −Δ3, and +Δ1; the counters in level 3 as −Δ1, −Δ2, +Δ1, and +Δ2; the counters in level 2 as −Δ1, +Δ1, +Δ2 and +Δ3; and the counters in level 1 as +Δ1, +Δ2, +Δ3, and +Δ4.

If the stress curve of Fig. 1 is metered between points $b$ and $j$ by the counters of Fig. 2, the counter −Δ4 in level 5 will first register 1 tally indicating that a flection point occurred in the fifth datum level and that the signal decreased through four datum levels before it reached the next flection point. Then the counter labelled +Δ3 in level 1 will register 1 tally indicating that a second flection point occurred in the first datum level and that the signal increased through three datum levels in passing from this second flection point to the next flection point. Following this, the counter labelled as −Δ1 in level 4 will register 1 tally indicating that a flection point occurred in the fourth datum level and that the signal decreased through one datum level before it reached the next flection point.

The counters of Fig. 2 are schematically shown as being actuated by operating coils. Thus in level 5 the four counters are actuated by the coils 43, 44, 45, and 46 respectively; in level 4 the four counters are actuated by the coils 49, 50, 51, and 52, etc. These coils are part of the electrical circuit illustrated in Fig. 4b, as will be explained later.

It is apparent that as a varying signal is analyzed counters such as those of Fig. 2, will register cumulative totals indicating the number of flections that have occurred during the time of metering and also the variation in amplitude between the flections. It should be noted that if more than five datum levels are used, the statistical record will become progressively more accurate. This is a matter of choice for one skilled in the art and analyzers using more than five channels are within the scope of this invention.

Figure 3:
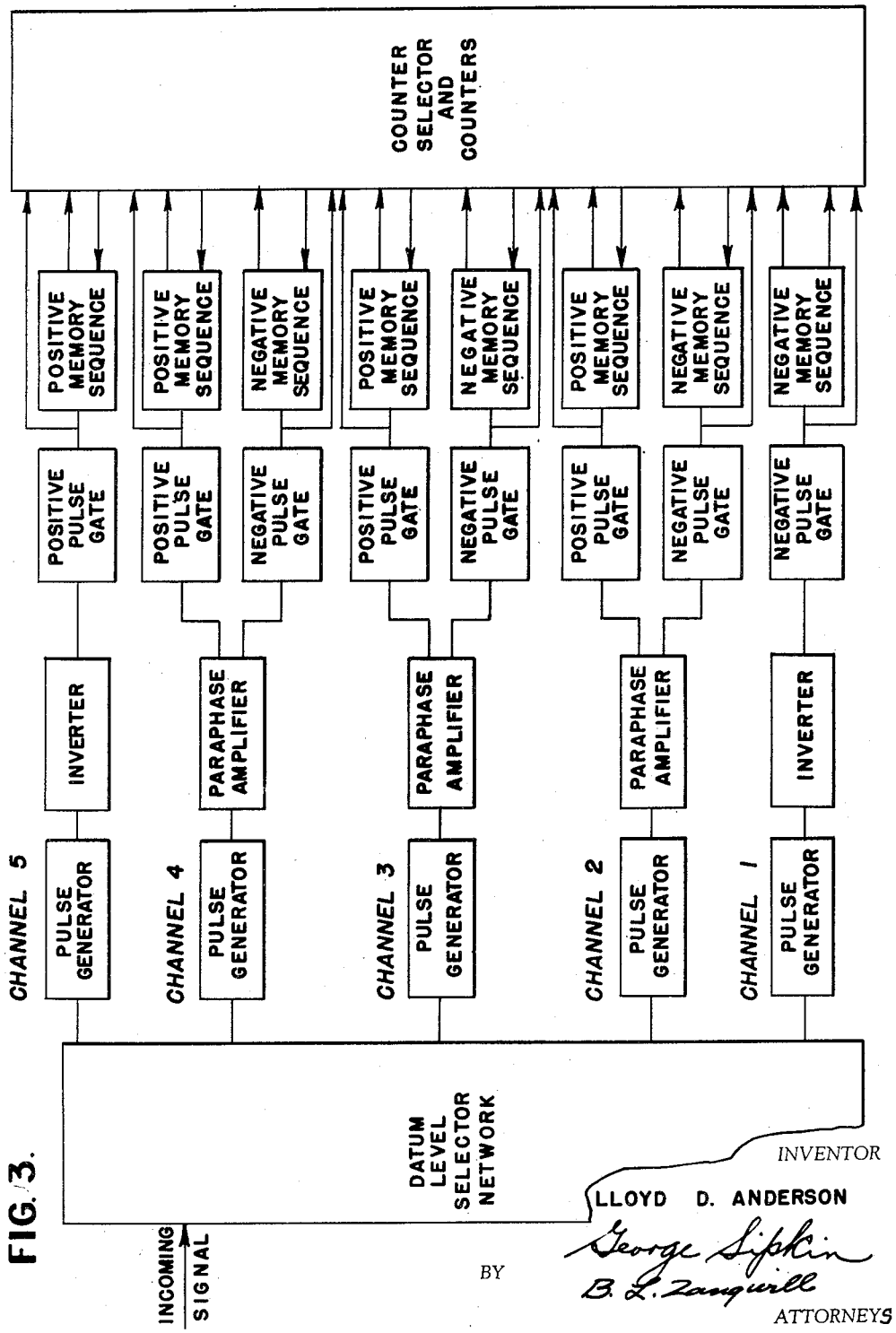
Fig. 3 is a block diagram of a variable amplitude signal analyzer and counter in accordance with the invention.

Referring now to Fig. 3, there is shown a block diagram of an analyzer circuit for operating a counter system such as shown in Fig. 2. An incoming signal varying in amplitude proportional to stress variation of an object under test is fed to a datum level selector network. Depending on the amplitude of the incoming signal voltage, an actuating voltage is fed to at least one of the five circuit channels.

The three middle channels, 2, 3 and 4, are all identical. Each includes a pulse generator to produce a pulse of desired polarity, and a paraphase amplifier to which the pulse is fed. If the input signal is ascending in datum level, a positive pulse gate will pass an output wave from the paraphase amplifier to a positive memory sequence circuit. If the input signal is descending, a negative pulse gate will pass an output wave from the paraphase amplifier to a negative memory sequence circuit. By suitable interconnections between the memory sequence circuits and a group of counter selectors, counters will be actuated to tally the number of flection points and difference in datum levels between flection points of the input signal.

After a counter registers a tally, a reset action takes place to erase the data stored by either the positive or negative memory sequence circuits, so that the analyzer will continue to register the tallies automatically.

The highest and lowest channel differ from the three middle channels. The highest level channel, 5, includes an inverter instead of a paraphase amplifier since only a single phase is necessary to actuate a positive pulse gate and positive memory sequence circuit. No negative pulse gate or negative memory sequence is necessary in the highest channel. Similarly the lowest channel, 1, does not require a positive pulse gate and a positive memory sequence. The reason for the simpler highest and lowest channel will become apparent from the detailed circuits of Figs. 4a and 4b.

Figure 4A:
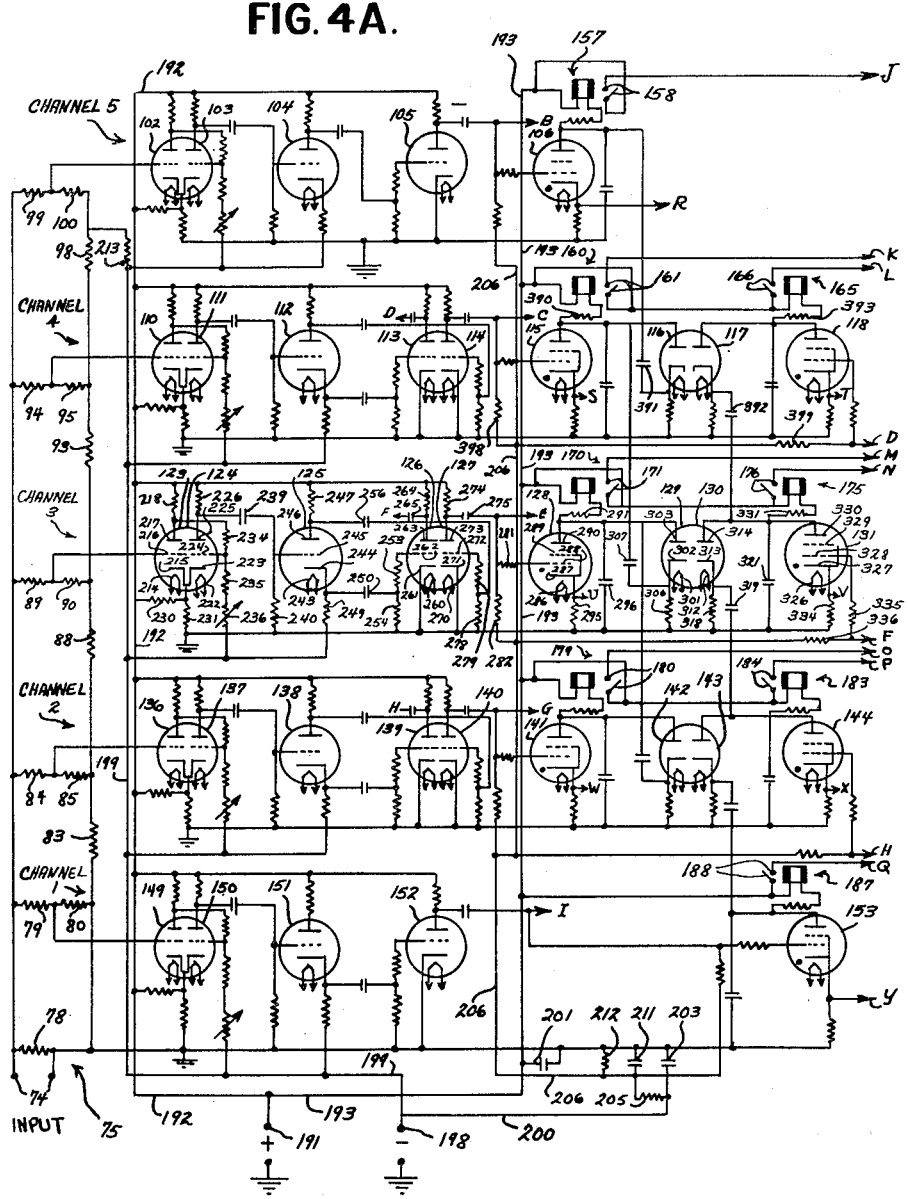
Figs. 4a and 4b jointly comprise a circuit diagram of a preferred embodiment of the invention when the lettered conductors on the right of Fig. 4a are joined to the correspondingly lettered conductors on the left of Fig. 4b.
Figure 4B:
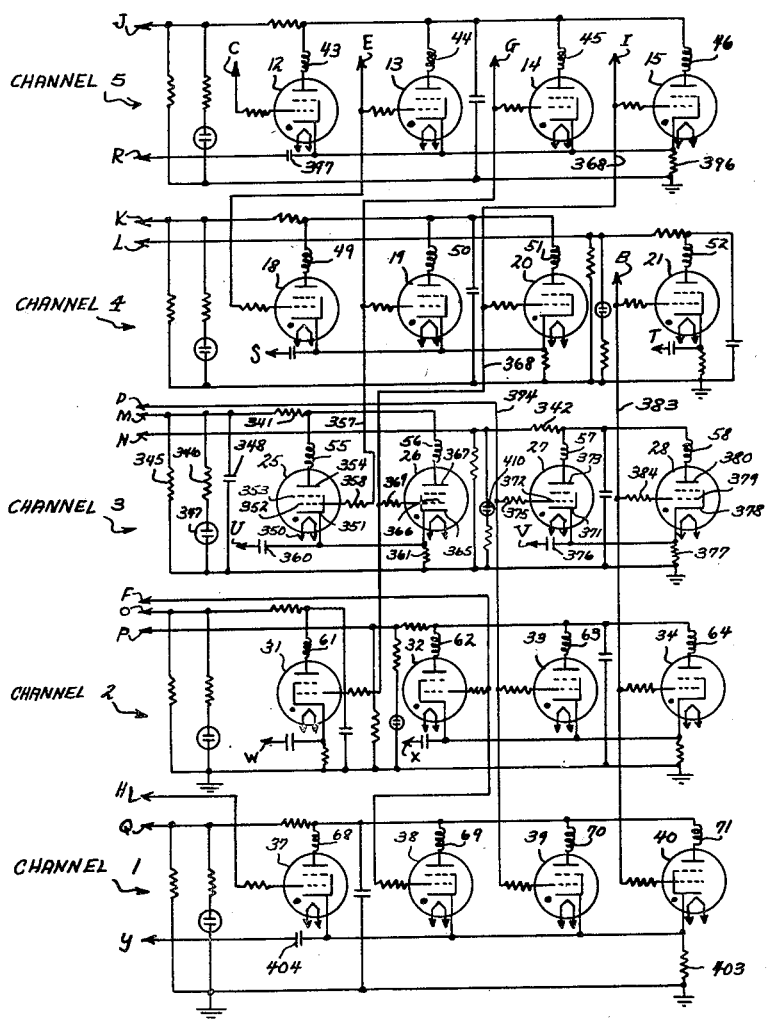

Figures 4a and 4b illustrate the analyzer circuit. Figure 4b discloses a group of counter tubes arranged in five channels. These channels correspond with the tally system illustrated in Fig. 2. The counter tubes are thyratrons and include counter actuating output coils in their anode circuits to actuate the counters of Fig. 2 when the thyratrons are fired.

Each channel comprises four counter tubes, thyratrons 12, 13, 14, and 15 for datum level 5, thyratrons 18, 19, 20, and 21 for datum level 4, thyratrons 25, 26, 27, and 28 for datum level 3, thyratrons 31, 32, 33, and 34 for datum level 2, and thyratrons 37, 38, 39, and 40 for datum level 1. Each thyratron has a counter coil in its anode circuit, as for example, a counter coil 43 in the anode circuit of thyratron counter tube 12, a counter coil 44 in the anode circuit of thyratron 13, a counter coil 45 in the anode circuit of thyratron 14, and a counter coil 46 in the anode circuit of thyratron 15 of the datum level 5. Similarly, counter coils 49, 50, 51, and 52 are in the anode circuits of thyratron counter tubes 18, 19, 20, and 21, respectively; counter coils 55, 56, 57, and 58 are in the anode circuits of thyratron counter tubes 25, 26, 27, and 28; counter coils 61, 62, 63, and 64 are in the anode circuits of thyratron counter tubes 31, 32, 33, and 34; and counter coils 68, 69, 70, and 71 are in the anode circuit of thyratron counter tubes 37, 38, 39, and 40, respectively.

The thyratron tubes and counter coils can be actuated to provide the required tallies by means of the circuitry illustrated in Fig. 4a.

Fig. 4a illustrates five individual circuit channels each of which correspond to the datum levels as illustrated in Fig. 2. An input voltage varying in amplitude proportional to variation in stress is applied to input terminals 74. From there the voltage is fed to voltage divider network 75 which corresponds to the datum level selector network of Fig. 3. This network includes resistor 78 across the input terminals 74, and the center tapped resistors 79 and 80 to provide an output voltage to channel 1; voltage dropping resistor 83 and center tapped resistors 84 and 85 to provide an output voltage to channel 2; voltage dropping resistor 88 and center tapped resistors 89 and 90 to provide an output voltage for channel 3; voltage dropping resistor 93 and center tapped resistors 94 and 95 to provide an output voltage to channel 4; and voltage dropping resistor 98 and center tapped resistors 99 and 100 to provide an output voltage to channel 5.

The resistors 79, 84, 89, 94, and 99 are all equal in value to resistors 80, 85, 90, 95, and 100, respectively. Their resistance is chosen so that there will be suitable limiting of grid current in the input tubes of each of the channels. The resistors 83, 88, 93, and 98 are all equal and small in value so that suitable progressively decreasing signal voltages will be applied to the input tubes of the five channels.

It will be noted that each of the channels is generally similar, and uses double tubes which for clarity in explanation are identified as single tubes.

Channel 5 includes double triode tubes 102 and 103 which are tied together so as to provide a desired output pulse, inverter tube 104, pulse gate tube 105, and memory tube thyratron 106. Channel 4 includes an arrangement of tubes 110, 111, 112, 113, 114, and 115. As explained in connection with Fig. 3, the intermediate channel 4 includes an extra pulse gate tube 114 that is not utilized in channel 5. Channel 4 also differs from channel 5 in the addition of two switching diodes 116 and 117, as well as the negative memory tube 118. Channels 3 and 2 provide arrangements substantially similar to that of channel 4. Channel 3 includes tubes 123, 124, 125, 126, 127, 128, 129, 130, and 131. Channel 2 includes tubes 136, 137, 138, 139, 140, 141, 142, 143, and 144. Channel 1, which is similar to channel 5, includes tubes 149, 150, 151, 152, and 153.

Each of the channels includes memory elements. Channel 5 includes a positive memory element which is the relay 157. Relay 157 includes contacts 158. Channel 4 includes the positive memory element in the form of a relay 160 which has contacts 161. In addition this channel includes a negative memory element, relay 165, which includes contacts 166. Channel 3 includes a positive memory element, relay 170, which has contacts 171. In addition there is provided a negative memory element, relay 175, which has contacts 176. Channel 2 has a positive memory element, relay 179, which includes contacts 180. There is also provided negative memory element, relay 183, which has contacts 184. Channel 1 includes the negative memory element, relay 187, which has contacts 188.

A source of positive potential is provided at terminal 191. A connection to the circuit from this positive terminal is made through bus wires 192 and 193. A source of negative potential is provided at terminal 198, and is applied to the circuit through bus wires 199 and 200. The positive terminal 191 is by-passed to ground through condenser 201. The negative terminal 198 is by-passed to ground by means of condenser 203.

In addition the negative terminal is connected to a voltage dropping resistor 205, which is tied to bus wire 206 so as to provide suitable negative grid potential for certain of the tubes of the circuit. Negative terminal 198 is also tied to ground through the decoupling condenser 211 and the resistor 212. Terminal 198 is also connected to voltage dropping resistor 213 by means of bus wire 199. A suitable negative cathode bias is thus provided for tubes 104, 112, 125, 138, and 151 since the cathodes of these tubes are all tied to bus wire 199.

Since the channels are all generally similar, a detailed explanation of the operation of the circuitry of channel 3 is provided so that operation of all the channels may be understood. In channel 3, tube 123 includes heater 214, cathode 215, control grid 216, and anode 217. Anode 217 is tied to positive bus wire 192 by means of anode resistor 218. Tube 124 includes heater 222, cathode 223, control grid 224, and anode 225. The anode 225 is tied to the source of positive potential through anode resistor 226. Resistor 230 ties both cathodes 215 and 223 to high potential bus wire 192. Cathode resistor 231 couples both cathodes 215 and 223 to ground. Anode 217 is tied to grid 224 through resistor 234. The potential of grid 224 is adjusted by means of the voltage divider arrangement comprising resistors 234, 235, and rheostat 236. An output from tube 124 is taken by means of coupling condenser 239 connected through resistor 240 to ground. Condenser 239 is also connected to the grid of paraphase amplifier tube 125.

Paraphase amplifier tube 125 includes heater 243, cathode 244, grid 245, and anode 246. The anode 246 is tied to the source of positive potential by means of anode resistor 247. Included in the cathode circuit is cathode resistor 249. An output is taken from the cathode side of resistor 249 by means of cathode follower action. This output is coupled through condenser 250 and resistor 253 to the grid of pulse gate tube 126. A conventional grid leak resistor 254 is connected between the junction point of condenser 250 and resistor 253 and ground.

Pulse gate tube 126 includes heater 260, cathode 261, grid 262, and anode 263. The anode 263 is tied to the source of positive potential through anode resistor 264. An output may be passed from anode 263 through condenser 265 to conductor connection F.

Pulse gate tube 127 includes heater 270, cathode 271, grid 272, and anode 273. Anode 273 is connected to the source of positive potential through anode resistor 274. An output may be passed from anode 273 through condenser 275 to conductor connection E. An input to tube 127 may be passed from the tube 125 through condenser 256 and resistors 278 and 279, to the grid 272.

The output from tube 127 is also passed through condenser 275 and resistor 281 to the grid of positive memory tube thyratron 128. Thyratron 128 includes heater 286, cathode 287, control grid 288, screen grid 289, and anode 290. Anode 290 is tied to the source of positive potential through voltage dropping resistor 291 and the operating coil of relay 170. Included in the cathode circuit is cathode resistor 295. The control grid 288 is tied to negative bus wire 206 by means of grid leak resistor 282. A condenser 296 is tied between the anode of tube 128 and ground in order to compensate for minor supply voltage fluctuations which may occur, and to make certain that conduction through the tube ceases only when the anode potential is sufficiently lowered by the action of switching tube 129. This will be more fully described later on.

Switching tube 129 includes heater 301, cathode 302, and anode 303. The high potential side of cathode resistor 306 is connected to the anode of positive memory tube 115 of channel 4 through condenser 307.

Switching tube 130 includes heater 312, cathode 313, and anode 314. The high potential side of cathode resistor 318 is tied to the anode of negative memory tube 144 in channel 2 through condenser 319. Condenser 321 couples the anode 314 of tube 131 to ground and thus compensates for variations in anode supply voltage in the same manner as condenser 296.

Negative memory tube thyrarton 131 includes heater 326, cathode 327, control grid 328, screen grid 329, and anode 330. Anode 330 is tied to the source of positive potential through voltage dropping resistor 331 and the coil of relay 175. Included in the cathode circuit is the cathode resistor 334. Control grid 328 is connected to resistor 335 so that a control pulse may be applied thereto from conductor connection F. This grid is also tied to negative bus wire 206 through grid current limiting resistor 336.

It is to be noted, (a) that conductor connection F has a lead extending from the anode 263 of tube 126 through condenser 265, and it also has a lead extending to the negative side of the cathode-follower resistor 335 of tube 131, (b) that conductor connection E has a lead from the anode 273 of tube 127 through condenser 275, and is also connected to grid 288 of tube 128 through resistor 281; (c) that conductor connection U extends from the cathode side of resistor 295; that conductors M and N extend from the front contacts of relays 170 and 175 respectively; and that conductor connection V extends from the cathode side of resistor 334.

Referring now to Fig. 4b it is seen that the various thyratron counter tubes have connecting bus wires wherein positive voltage may be applied to their anodes and also to their grids. The tubes are operated in such a manner that it is necessary that there be an application of a positive voltage on the anode of a counter tube concurrently with application of a positive pulse on the grid of the tube in order that the tube may be fired. The anode voltages are applied at points J, K, L, M, N, O, P, and Q; while the grid voltages are applied at points C, D, E, F, G, H, and I. When any of the thyratron counter tubes fire a circuit reset action takes place because of the passage of a positive voltage pulse to the thyratron memory tubes at points R, S, T, U, V, W, X, and Y.

The analagous relation between the various conductor connection points will be best understood in the following table:

| | Counter tube anode potential connection points | | Counter tube grid potential connection points | | Memory tube reset pulse connection point | |
|---|---|---|---|---|---|---|
| | Negative increment | Positive increment | Negative increment | Positive increment | Negative memory | Positive memory |
| Channel 5 | J | | C, E, G, I | | | R |
| Channel 4 | K | L | E, G, I | B | T | S |
| Channel 3 | M | N | G, I | B, D | V | U |
| Channel 2 | O | P | I | B, D, F | X | W |
| Channel 1 | | Q | | B, D, F, H | Y | |

Proceeding now to a comparison of Figs. 4b and 2, it is seen that the thyratron tubes 25 and 26 of channel 3 correspond with the negative increment tally counters of Fig. 2 and the thyratron tubes 27 and 28 correspond with the positive increment tally counters. The negative increment tubes 25 and 26 have their voltages controlled at point M. Since point M is at positive potential only when the contacts 171 of relay 170 in Fig. 4a are closed, it is seen that the relay 170 is a negative memory control element. Similarly the positive increment tally tubes 27 and 28 have their anode voltages controlled at point N. Point N is at a positive potential only when the contacts 176 of relay 175 are closed. Consequently it may be said that the relay 175 is a positive memory control element.

By way of further description of channel 3, in Fig. 4b, it is noted that there is provided a voltage dropping resistor 341 so that the desired positive potential may be applied to the anodes of negative increment tubes 25 and 26. Similarly the voltage dropping resistor 342 is provided so that suitable positive potential may be applied on the anodes of the positive increment tubes 27 and 28. Resistor 345 is connected between point M and ground as a protective device in case a short circuit should develop across either of the tubes 25 or 26. Resistor 346 and lamp 347 are connected between point M and ground to indicate that positive potential is being applied at point M. Condenser 348 decouples point M to ground and acts to prevent undesirable interaction between circuit components. Tube 25 includes heater 350, cathode 351, control grid 352, screen grid 353, and anode 354. Bus wire 357 makes it possible to apply a positive pulse to the control grid 352 from point G through resistor 358. Condenser 360 ties the cathode 351 to point U. Resistor 361 provides a voltage drop between the cathodes of tubes 25, 26 and ground.

Similarly thyratron tube 26 includes cathode 365, control grid 366 and anode 367. A positive pulse may be applied to the control grid 366 from point I through bus wire 368 and resistor 369. The positive increment tube 27 includes cathode 371, control grid 372 and anode 373. A positive pulse may be applied at the control grid 372 from point D through bus wire 374 and resistor 375. Condenser 376 ties cathode 371 to point V. Resistor 377 provides a voltage drop in the cathode circuits of tubes 27 and 28. Tube 28 includes cathode 378, the control grid 379 and anode 380. A positive pulse may be applied to the control grid 379 from point B through bus wire 383 and resistor 384.

The manner in which the counter tubes of Fig. 4b are actuated will be more clearly brought out when the operation of the circuitry of Fig. 4a is explained.

The voltage dropping datum level selector network 75 is arranged so that for a fixed signal across the terminals 74, the voltage to the control grids of the tubes 149, 136, 123, 110, and 102 is progressively decreased. This is due to the voltage dropping action of resistors 83, 88, 93, and 98. Since the above listed tubes are all identically biased to conduct only when their applied grid voltage rises above a predetermined level, it is seen that if a signal of varying amplitude is applied across the terminals 74 conduction will occur only through those tubes wherein the negative bias is sufficiently overcome. A greater input signal voltage will thus actuate more of the tubes and hence channels, than a lower voltage will. For example, if the input signal of Fig. 1 rises to point $a$ in datum level 4, channels 1, 2, 3, and 4 will be actuated since tubes 149, 136, 123, and 110 of Fig. 4a will commence conduction. When the signal reaches point $b$ in datum level 5, of Fig. 1, the fifth channel will also become actuated since tube 102 will commence conduction. When the signal drops to point $c$ in datum level 4, the input grid voltage to tube 102 is insufficient to overcome the tube bias, the tube will cease conduction, and channel 5 will become deactuated. As the channels become actuated or deactuated there are produced various circuit interactions which will be better understood from the description of the operation of channel 3.

In general, tubes 123 and 124 are connected together in flip flop relationship and act to provide an output pulse at such time as the signal being analyzed rises to the datum level of channel 3. This pulse is passed to tube 125. Tube 125 acts as a paraphase amplifier and produces two pulses of opposite phase, one of which is effective to set up a positive memory function, the other of which is effective to set up a negative memory function. Tubes 126 and 127 act as pulse gates. These tubes are both operated at a point very close to saturation. Consequently the application of a positive pulse to the control grids of these tubes produces an attenuated negative pulse at the anodes thereof. These attenuated negative pulses are very small and ineffective to cause any further circuit action. However, if a negative pulse is applied to the grids of these tubes a non-distorted and amplified positive pulse is passed at the anodes thereof. Thyratron tube 128 in combination with relay 170 acts to provide a positive memory function. Diode 129 may be thought of as a switching tube which acts to extinguish the positive memory tube 115 in channel 4 at the desired time. Diode 130 acts as a switching tube to extinguish the negative memory tube 118 in channel 4 at the desired time.

In standby condition the tube 124 of channel 3 (and the corresponding tubes of the other channels) is normally conducting since the grid 224 of the tube is set at a sufficiently high potential by operation of the rheostat 236. The resistor 230 ties the cathodes 215 and 223 to the positive bus wire 192. The cathode 215 is held at a sufficiently positive potential with respect to anode 217 so that tube 123 does not normally conduct.

In operation, when a positive voltage is applied on the grid 216, as when the signal level is increasing through the datum level 3, the grid 216 swings sufficiently positive so that tube 123 conducts. The tube inverts the applied signal voltage since anode 217 drops in potential, and a negative pulse is fed through resistor 234 to the grid 224 of the tube 124. This cuts down conduction through tube 124 and produces a positive pulse on anode 225. Tube 124 is then cut off and tube 123 remains conducting. The positive pulse developed on anode 225 is passed through condenser 239 to grid 245 of paraphase amplifier tube 125. This produces an increase of conduction through tube 125 with the result that anode 246 drops in potential and a negative pulse is produced thereon. At the same time a voltage is developed across cathode resistor 249 which is in phase with the voltage on grid 245; consequently a positive pulse is produced at the cathode 244.

The negative pulse developed on anode 246 is fed through condenser 256, resistor network 278, 279 to grid 272 of tube 127. Tube 127 is operated near its saturation point; consequently this applied negative pulse is not attenuated. Conduction through the tube is diminished with the result that a positive pulse is developed at anode 273. By means of condenser 275 and resistor 281 this positive pulse is fed to grid 288 of thyratron tube 128. The anode 290 of this tube is normally at positive potential with respect to its cathode since it is tied to the source of positive potential 191 by means of the connection through resistor 291, the coil of relay 170, and positive bus wire 193. However, this tube is not conducting since it is also necessary that a positive pulse be applied to the control grid 288. When that pulse is applied, as in the manner just described, the tube fires. Current passes through resistor 291 and the coil of relay 170. Relay 170 is now effective to close the contacts 171. When contacts 171 are closed the point M is raised to the positive potential of bus wire 193 since there is a direct connection to it through the contacts 171. This applies positive potential to the anodes 354 and 367 of contour tubes 25 and 26 of Fig. 4b. These tubes are then placed in "ready" position but they are not fired until a positive pulse is applied to their respective control grids.

Returning now to the positive phase pulse developed across cathode resistor 249 of paraphase amplifier 125, it will be noted that this pulse is passed by means of condenser 250 and resistors 253, 254 to control grid 262 of tube 126. This results in only a slight increase in conduction through tube 126 since the tube is operating at almost saturation level. Consequently the negative pulse developed on anode 263 and passed by condenser 265 is attenuated and is insufficient to cause any circuit effect at point F.

The above circuit operation may be summarized with the statement that as signal level increases through channel 3, relay 170 is actuated and brings about the application of positive potential to the negative increment counter tubes 25 and 26. Since relay 170 is closed and the tube 128 fired when the input signal increases through the channel level, the relay and tube may be said to provide a positive memory function.

If instead of increasing as described, the signal level decreases through the datum level of channel 3 after it has once risen through it, the following action takes place. Tube 123 is conducting, tube 124 is not conducting. As the voltage on grid 216 decreases, current flow through tube 123 will diminish. This results in a positive pulse being developed on anode 217 and passed to grid 224 of tube 124. This will cause conduction through tube 124. When current flows through anode 225 of tube 124, a negative pulse is passed through condenser 239 to grid 245 of paraphase amplifier tube 125. This causes generation of a first pulse at the anode 246 and a second pulse at the cathode 244, the phases of which are exactly opposite to what they were when the signal level was increasing through channel 3. A positive pulse is passed from anode 246 through condenser 256, resistor network 278, 279 to the grid 272 of gate tube 127. Since tube 127 is operating at almost saturation point this positive input pulse is attenuated so that the negative pulse at condenser 275 provides no further circuit reaction.

However, the negative pulse passed from cathode 244 through condenser 250, voltage dropping network 253, 254 is applied to the grid 262 of gate tube 126. This pulse is effective to diminish conduction through the tube; this results in a positive pulse developed at anode 263 and passed through condenser 265 to tie point F. Point F is connected to control grid 328 of negative memory thyratron 131 by means of resistor 335. Consequently the positive pulse passed from condenser 265 is applied to the grid 328. The anode 330 of tube 131 is normally at positive potential by means of the connection through resistor 331, the coil of relay 175, and the bus wire 193. Tube 131, therefore, fires when its control grid 328 swings positive. Current passes through the tube, through resistor 331 and actuates the relay 175. This is effective to close contacts 176 and therefore apply positive potential at point N. As seen in Fig. 4b, point N is tied to the anodes 373 and 380 of counter tubes 27 and 28 respectively. These tubes are, therefore, put in "ready" condition but will not fire until a positive voltage is applied at their respective grids. Since the relay 175 and the tube 131 are actuated when there is a decrease in signal level through the channel they are said to perform a negative memory function.

The individual channels are tied together in such a manner that when the signal level increases from one channel to the level of the next higher channel the positive memory relay in the lower channel is deactuated. Similarly when the signal level decreases from one channel to the level of the next lower channel the negative memory relay of the higher channel is deactuated. For example, assume that the signal rises through the datum level of channel 3 to the level of channel 4. Positive memory relay 170 of channel 3 will be in the actuated position so that contacts 171 are closed. When the signal reaches the datum level of channel 4 the positive memory relay 160 will be actuated in the identical manner that relay 170 was. That is to say, positive memory tube 115 will fire and cause current to pass through the relay 160.

When current initially surges through tube 115 a negative pulse will be developed at its anode since its anode will drop in potential. This negative pulse is passed through condenser 307 to cathode 302 of switching tube 129. The decrease in potential of this cathode makes it possible for conduction to occur through the tube, since the anode 303 of the tube is tied through resistor 291 and the coil of relay 170 to the positive bus wire 193. Conduction through tube 129 will cause an increase of current through voltage dropping resistor 291. Since the voltage drop across resistor 291 is increased there will be insufficient voltage applied between the anode 290 and cathode 287 of positive memory tube 128 to maintain conduction. The tube 128 is therefore extinguished. This results in deactuation of relay 170 and the opening of contacts 171.

Similarly if the signal level were decreasing from channel 3 to channel 2 it will be seen that first the relay 175 is closed, then the relay 183 will be closed and a pulse will be applied from channel 2 to channel 3 so that relay 175 will be opened. This is explained as follows: When the signal is decreasing through channel 3, relay 175 will be closed since conduction will occur through negative memory tube 131. This will result in closing of contacts 176. When the signal level drops to the datum level of channel 2, relay 183 will then be closed since negative memory tube 144 will conduct. When tube 144 commences conduction, a negative pulse will be developed at the anode thereof. This negative pulse will be passed through condenser 319 to the cathode 313 of switching tube 130. The drop in potential of cathode 313 will cause conduction to occur through tube 130 since the anode 314 is connected through resistor 331, and the coil of relay 175 to the positive bus wire 193. When the tube conducts a sudden increase of current through resistor 331 will take place. The increase of current through resistor 331 will create a large voltage drop across it. Insufficient voltage will then be available at the anode 330 to maintain conduction of tube 131. Consequently this tube will cease to conduct, relay 175 will be de-energized and contacts 176 opened.

It is seen that if an input signal increases from one datum level to a successively higher level, the positive memory element in the higher level is actuated and is effective to deactuate the positive memory relay in the lower level. Similarly if input signal decreases from one level to the next lower level the negative memory relay in the lower level will be actuated and will be effective to deactuate the negative memory relay in the higher level.

This circuit action is desirable as will be seen when a varying signal is analyzed as for example, the signal of Fig. 1 between points a and j. When the signal of Fig. 1 is fed to the analyzer circuit of Figs. 4a and 4b, it will be seen that the signal level at a is in the fourth datum level and is increasing in a positive direction. Therefore, a positive voltage will be applied on the grid of tube 110 of channel 4. This will be sufficient to cause conduction of the tube. The conduction through tube 110 will produce a negative pulse on the anode thereof. This negative pulse is fed to the grid of tube 111 which is then conducting and will cause conduction to cease through tube 111. This will develop a positive pulse on the anode of tube 111. This positive pulse is fed to the grid of paraphase amplifier tube 112. The pulse will be inverted at the anode of tube 112 and fed as a negative pulse to the grid of gate tube 114. This will cause diminished conduction through tube 114 with the result that a positive pulse is passed from the anode thereof to the control grid of positive memory tube thyratron 115. Since the anode of this tube is at positive potential, because of its connection through resistor 390 and relay 160 to bus wire 193, the tube will fire. Conduction through tube 115 is effective to actuate relay 160 and close contacts 161. This provides a positive voltage at point K since there is a direct connection to the source of positive potential from point K through contacts 161 to bus wire 193. As will be noted in Fig. 4b, the negative increment tubes 18, 19, and 20, therefore, are in the "ready" position since their anodes are now at a positive potential. These tubes do not fire, however, since no positive pulse is applied to their control grids.

It will be noted that the paraphase amplifier 112 also develops a positive pulse at its cathode. This positive pulse is fed to the grid of 113, but since tube 113 is operated at very near saturation point, conduction through the tube increases only slightly. This is to say that the tube attenuates the positive pulse at its grid so that there is only a very slight negative pulse taken from its anode at point d. This attenuated negative pulse is ineffective to cause any further circuit reaction.

The signal level then increases to point b in Fig. 1. This point is in the fifth datum level. The positive pulse applied at the grid of tube 102 of channel 5 causes a positive pulse to be generated by means of tubes 102 and 103. This pulse is inverted at tube 104, inverted and passed by gate tube 105, and fed as a positive pulse to the thyratron memory tube 106 in exactly the same manner that a positive pulse was fed to tube 115 in channel 4. Thyratron 106 then conducts and causes the relay 157 to be actuated. This causes contacts 158 to close and results in the application of positive potential at point J. As will be seen in Fig. 4b, the counter tubes 12, 13, 14, and 15 will now be placed in a "ready" position since their anodes are all tied to point J which is tied to positive bus wire 193.

It should also be remembered that when thyratron 106 commences to conduct, the potential at the anode thereof drops. This drop in potential is communicated through condenser 391 to the cathode of diode switching tube 116. This results in an increased potential difference between the anode and cathode of tube 116, and it conducts. This causes an increase of current through resistor 390 and therefore an increased voltage drop across resistor 390. The potential of the anode of tube 115 is lowered to the point where the tube ceases to conduct. This results in de-energization of relay 160 and the opening of contacts 161. Consequently point K is no longer at positive potential.

Since point b is a flection point on the curve of Fig. 1, it is seen that the circuit should tally this fact. One of the counter tubes 12, 13, 14, or 15 of Fig. 4b will be fired to cause a counter to register this information; the one which will fire will be determined by the datum level to which the signal drops from point b to produce the next flection point. Since the next flection point is at point f, it may be seen that there is a decrease of four datum levels to the next flection point. In Fig. 2 it is seen that the counter in level five, labelled as —Δ4 is in the top right-hand corner of the figure. Counter tube 15, with its actuating coil 46, will cause this counter to register one tally. This will be accomplished by the simultaneous application of positive plate potential from point J and positive control grid potential from point I as follows:

When the signal decreases from datum level five to datum level four, the voltage on the grid of tube 102 drops. This cuts off conduction through tube 102; a positive pulse is developed at the anode of tube 102 and passed to the grid of tube 103. This is sufficient to cause conduction of tube 103. A negative pulse is therefore passed from the anode of tube 103 to the grid of tube 104. The pulse is there inverted and passed as a positive pulse to gate tube 105. Since tube 105 operates at very near saturation level, this positive pulse is attenuated and only a very slight negative pulse is developed at its anode. This negative pulse is fed to the control grid of thyratron 106 but is insufficient to cut off conduction of that tube. Consequently relay 157 remains actuated and contacts 158 remain closed. Point J is still at positive potential and the tubes 12, 13, 14, and 15 of Fig. 4b are still in the "ready" position.

As the signal drops through point c in datum level four, the grid voltage at 110 diminishes and will finally result in cutting off of conduction through tube 110 when the signal drops to the third datum level. A positive pulse is then passed from the anode of tube 110 to the grid of tube 111. This causes tube 111 to become conducting. A negative pulse is passed from the anode of this tube to the grid of paraphase amplifier tube 112. At the anode of this tube the negative pulse is inverted and passed as a positive pulse to the grid of gate tube 114. Since this tube is operating at nearly saturation level, the pulse is attenuated and the resultant negative pulse at the anode thereof is insufficient to cause any further circuit reaction.

The paraphase amplifier tube 112 also develops a negative pulse at its cathode. This negative pulse is fed to the grid of gate tube 113. The negative pulse is effective to diminish conduction through the tube with the result that a positive pulse is passed from the anode thereof, through tie point D, to the control grid of negative memory thyratron tube 118. Since this tube has its anode at positive potential, conduction then occurs through it. This results in current passing through the relay 165 and the closing of contacts 166. It is seen that point L is therefore at positive potential because of the direct connection through contacts 166 to the positive bus wire 193.

As the signal level then drops through point d of Fig. 1, and on down to datum level two, negative memory tube 131 is fired and negative memory relay 175 is energized. When negative memory tube 131 conducts the potential of anode 330 drops. This drop in potential is communicated through condenser 392 to the cathode of switching tube 117. This causes conduction of tube 117 and results in an increased current through resistor 393. The potential of the anode of tube 118 is then lowered to the point where the tube ceases to conduct. This results in de-energization of negative memory relay 165.

As the signal drops through point e, and down to point f, of Fig. 1, the negative memory relays 183 and 187 are successively energized. As relay 183 is energized relay 175 is caused to be de-energized in exactly the same manner that relay 165 was de-energized. Similarly when relay 187 is energized relay 183 becomes de-energized. It is seen that when the signal reaches datum level one, the positive memory relay 157 is still actuated, and the negative memory relay 187 is also actuated.

When the signal level drops through the level of channel 1 the grid voltage of tube 149 drops and diminishes conduction through the tube. This raises the potential of the anode and a positive pulse is passed to the grid of tube 150. This is effective to cause conduction of tube 150, which results in a negative pulse being passed from the anode thereof to the grid of inverter tube 151. By means of cathode follower action, this negative pulse is applied to the grid of gate tube 152. A positive voltage is then developed at the anode of this tube and passed to the control grid of negative memory tube 153. This fires tube 153, and closes relay 187.

In addition the positive pulse from the anode of tube 152 is passed to connection point I and is fed to the grid of counter tube 15 in Fig. 4b. This results in the firing of counter tube 15. Current will then pass through coil 46 and the counter —Δ4 actuated to produce one tally as shown in level five of Fig. 2.

When counter tube 15 fires a reset action occurs. This is brought about since a voltage drop is developed across cathode resistor 396. This charges condenser 397. This condenser will then discharge and pass a positive pulse to point R. It is seen in Fig. 4a that when point R is raised in potential the cathode of thyratron tube 106 will be raised in potential and by an amount sufficient to cut off conduction through the tube. This results in de-energization of the relay 157 and the opening of contacts 158. This is done so that at such time as a tally is made the controlling memory relay of the channel that the tally is made in will be de-energized and reset. The particular channel is then made ready for another tally.

Referring once again to Fig. 1, it will be noted that after the signal passes flection point f it rises to point g of datum level two, point h of datum level three, and stops raising at flection point i. This will result in actuation of positive memory relays 179, 170 and 160 in a manner similar to that already explained. As each of the relays are successively energized, the relay in the next lower channel is de-energized. Consequently when the signal reaches point i of datum level four only the positive memory relay 160 is actuated, and the negative memory relay 187 remains actuated. At the time that relay 160 is actuated a positive pulse is produced at point C. This applies a positive grid voltage to thyratron counter tube 12 but since there is no positive anode potential on this tube it does not fire.

It is also seen that point C is tied to the source of negative potential through resistor 398 and bus wire 206. Bus wire 206 is tied to ground through condenser 211 and resistor 212. Condenser 211 is of high capacitance. Consequently the positive pulse which was effective to fire thyratron tube 115 is shorted to ground through resistor 398, bus wire 206, condenser 211 and resistor 212 and produces no further circuit reaction. No positive pulse is passed through resistor 399 to point D or to the control grid of negative memory tube 118.

When the signal has reached the level of point i of Fig. 1, it reverses and decreases in value to the level at point j. Therefore the signal applied to the grid of tube 110 of channel 4 begins to become less positive. The anode of tube 110 is raised in potential and a positive pulse is applied to the grid of tube 111. This causes tube 111 to commence conduction with the result that the anode thereof drops in potential. This decreased potential is passed to paraphase amplifier tube 112. The anode of tube 112 inverts this negative pulse and passes a positive pulse to the grid of pulse gate tube 114. Since tube 114 operates at almost saturation level, it will attenuate the positive pulse applied to its grid and only a very slight negative pulse will be produced at its anode, This negative pulse is inadequate to produce any further circuit reaction. At the same time that the anode of paraphase amplifier tube 112 produces a positive pulse the cathode thereof produces a negative pulse by means of cathode follower action. This negative pulse is applied to the grid of pulse gate tube 113, and is inverted so that a positive pulse is produced at connection point D.

It will be noted in Fig. 4b that point D is the supply point for grid voltage to be applied to counter tubes 27, 33, and 39. Since the counter tubes 27 and 33 do not have applied anode potential, and tube 39 does have anode potential as applied from point Q, tube 39 will be fired by the application of the positive pulse from point D. By comparison of Figs. 2 and 4b, it will be seen that when counter tube 39 fires, coil 70 will be energized to operate the counter labelled as +Δ3 of level one. This tally is desired since it indicates that a flection point occurred at datum level one and that the signal increased three datum levels until the next flection point occurred.

When counter tube 39 of Fig. 4b fires, a voltage drop will occur across cathode resistor 403. Condenser 404 will be charged and will pass a positive pulse to point Y. As will be seen in Fig. 4a, point Y is a tie point above the cathode resistor of negative memory tube 153. Consequently when the counter tube 39 fires the positive pulse will be passed to the cathode of negative memory tube 153, and will result in an increase in potential of the cathode thereof. This will extinguish negative memory tube 153, open relay 187, cut off anode potential for counter tubes 37, 39 and 40, and thus reset the circuit.

When the signal decreases from datum level four down to datum level 3 from point i to point j of Fig. 1, it will be seen that the positive memory relay 160 remains closed, with the result that positive anode potential is applied from point K to the three negative increment recording counter tubes 18, 19, and 20. No other relays are closed.

As the signal drops from datum level 4 to datum level three, it will be seen that negative memory relay 165 is first closed, and then negative memory relay 175 is closed. A negative pulse is sent back to the cathode of switching tube 117 with the result that negative memory relay 165 will be opened. Since point j of Fig. 1 is a flection point, the circuit will then be effective to fire counter tube 18 because of a positive pulse applied from point E of channel 3 in Fig. 4a to point E in Fig. 4b. Conduction through this tube will cause the counter −Δ1, in level 4 of Fig. 2 to record one tally. At the same time that counter tube 18 conducts, a reset action again occurs since a positive pulse is passed from point S to cut off conduction through memory tube 115 and thus open relay 160. The above described circuit action is continuous and will cause the counters of Fig. 2 to tally comulatively as the signal varies in amplitude.

In addition glow tubes have been provided in the counter tube circuits of Fig. 4b so that whenever anode potential is applied to the counter tubes a glow tube will light up. For example, in channel 4 glow tube 347 will light up whenever plate potential is applied at point M. Similarly glow tube 410 will be lit up whenever plate potenial is applied at point N. These glow tubes are used to provide a visual indication that the circuit is operating properly.

The signal analyzer circuit described above eliminates previous inefficient mechanical type systems and provides a counter system that tallies flection points and variation in datum level between them in a manner heretofore unknown. Any suitable pickup means may be used to provide an electrical signal varying in amplitude with respect to time proportional to variation of stress with respect to time of an object under test. This electrical signal is fed to a datum level selector and quantized so as to energize one or more circuit channels. These circuit channels are tied in with a series of counters in such a manner that it is possible to obtain a complete record of signal variation in a unique and relatively simple manner.

It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be protected by Letters Patent of the United States is:

1. In a stress cycle counter the improvement comprising a plurality of channels in parallel connection, at least one of said channels including a positive memory tube and a negative memory tube, means comprising an input voltage having an instantaneous value representative of the instantaneous magnitude of stress on an object being metered to cause conduction of said positive memory tube when the voltage increases through a predetermined datum level, means comprising said input voltage to cause conduction of said negative memory tube when said voltage decreases through a predetermined datum level, a positive memory element actuated when said positive memory tube conducts, and a negative memory element actuated when said negative memory tube conducts, first switching means interconnecting the positive memory tube present in each channel except the lowest with the positive memory tube of the channel corresponding to the next higher datum level, second switching means interconnecting the negative memory tube present in each channel except the highest with the negative memory tube of the channel corresponding to the next lower datum level, said first switching means arranged so that as said voltage increases through successively higher datum levels conduction of all positive memory tubes except the one at the highest datum level reached is cut off, said second switching means arranged so that as said voltage decreases through successively lower datum levels conduction of all negative memory tubes except the one at the lowest datum level reached is cut off.

2. A counter for measuring stress flections in an object under test comprising an input to which a voltage proportional to stress is applied, a voltage divider network connected to said input, said network including output leads separated by equal voltage dropping resistors, a plurality of circuit channels to which said leads are respectively connected, each of said channels including a flip flop circuit to which one of said respective leads is tied, each flip flop circuit being biased so as to make each channel responsive only to a voltage corresponding to a predetermined datum level of stress, each channel including a positive memory storage element and a negative memory storage element, circuit means connecting the output of said flip flop circuits with said positive and negative memory elements whereby said positive memory element is actuated as the voltage increases to the datum level of stress the channel is responsive to and whereby said negative memory element is actuated as the voltage decreases to the last named datum level, first switch means associated with the positive memory elements and so arranged that as the voltage increases through a plurality of datum levels all positive memory elements except the one at the highest level reached are deactuated, second switch means associated with the negative memory elements and so arranged that as the voltage decreases through a plurality of datum levels all negative memory elements except the one at the lowest level reached are deactuated.

3. A counter as in claim 2, each channel including a plurality of counter tubes, each counter tube rendered conducting only when there is a coincidence of application of positive plate voltage and positive grid voltage, means connecting said counter tubes with said memory elements and with said circuit means so that when a voltage flection occurs at any stress datum level a counter tube in the channel corresponding to that stress datum level is rendered conducting, the particular tube indicating the amount and direction of change in voltage between successive flections.

4. In a stress flection counter the improvement comprising a plurality of circuit channels, each channel tied to a successive channel through a voltage divider network whereby the channels are made responsive to successively increasing datum levels of applied voltage, an input voltage to said network, said input voltage varying according to change in stress of an object under test, at least one of said channels including a pulse generator which produces a positive output pulse as stress level increases and a negative output pulse as stress level decreases through the datum level to which the channel is responsive, a paraphase amplifier to which the output pulse from said pulse generator is fed, two output leads from said paraphase amplifier whereby two out of phase voltages may be taken, pulse gate means to which said output leads are tied, said pulse gate means having two positive pulse outputs, a positive pulse being produced at one of said outputs only when said stress is increasing, and a positive pulse being produced at the other of said outputs only when said stress is decreasing.

5. In a stress flection counter of the type wherein there are a plurality of channels each responsive to a progressively increasing datum level of stress, the improvement comprising a plurality of counter tubes in each channel, a positive memory element and a negative memory element in each channel, circuit means to energize the positive memory element if stress is increasing and to energize the negative memory element if stress is decreasing, said memory elements connected to said counter tubes to control application of anode voltage thereto, circuit means to apply a positive pulse to the grid of the appropriate counter tube whereby it is fired when a stress flection occurs, and circuit means associated with said counter tubes and the memory elements whereby firing of the counter tube de-energizes the memory element controlling application of plate voltage thereto.

6. A wave analysis apparatus for a wave varying in magnitude over a range of magnitude datum levels with respect to time comprising, a plurality of channels, means to apply a voltage representative of the instantaneous magnitude of said wave to the input of all said channels, the input of each channel being biased to be actuated at a different predetermined level of input voltage corresponding to one of said datum levels, at least one memory tube in each channel, a plurality of counting tubes associated with each channel, means responsive to a flection of the wave occurring within a datum level to actuate a memory tube in the corresponding channel, means responsive to actuation of the memory tube to energize and ready at least one of the counting tubes associated with said channel, and means responsive to a second flection of said wave to trigger a particular one of said counting tubes readied by said memory tube, whereby the wave magnitude in terms of datum level difference between flections of the curve is recorded.

7. A wave analysis apparatus according to claim 6 wherein the particular counting tube triggered by the second flection is determined by the datum level at which the second flection occurs.

8. An apparatus for analyzing stress flection in an object comprising, an input electrical signal varying in magnitude with respect to time in the same manner as said stress, a plurality of electrical channels having said signal applied thereto, each channel containing an input device biased to be actuated at a different predetermined level of signal voltage, at least one memory circuit in each channel, a plurality of electronic counting means in each channel, means in each memory circuit responsive to a flection of the electrical signal at the level associated with the channel to apply plate potential to at least one of said electronic counting means of the channel, and means responsive to a subsequent flection of said signal to trigger a particular one of the electronic counting means having plate potential applied by the action of the memory circuit means.

9. An apparatus according to claim 8 wherein the means responsive to a subsequent flection of the electrical signal comprises the input device of the channel associated with the input level at which the subsequent flection occurs.

10. An apparatus according to claim 8 wherein the input device of each channel is a bi-stable trigger circuit.

11. A wave analysis apparatus comprising a plurality of channels, a bi-stable trigger circuit in the input of each channel, means to apply an electrical signal representative of the wave to be analyzed to the inputs of all of said channels so that each bi-stable trigger circuit is actuated at a different predetermined signal level, memory circuit tubes successively actuated by the output of each of the trigger circuits as the signal passes through the predetermined level to which the respective input circuit is responsive, a plurality of counting tubes in each channel, relay means responsive to actuation of the memory circuit tubes to apply plate voltage to at least one of the counting tubes in the channel, and means responsive to a flection in the electrical signal including the trigger circuit responsive to the input level at which the flection occurs to trigger one of the counting tubes to which plate voltage has been applied by a prior actuation of the memory circuit tubes.

References Cited in the file of this patent

UNITED STATES PATENTS

| | | |
|---|---|---|
| 2,500,935 | Deitz | Mar. 21, 1950 |
| 2,590,057 | Wiegand | Mar. 18, 1952 |
| 2,591,541 | Gulden et al. | Apr. 1, 1952 |

OTHER REFERENCES

Electronics for the Nuclear Physicist, II, Elmore, Nucleonics, March 1948; pages 28 to 35.